United States Patent
Stalsberg (10) Patent No.: US 6,647,790 B2
(45) Date of Patent: Nov. 18, 2003

(54) FIXED-BANDWIDTH CORRELATION WINDOW METHOD AND SYSTEM FOR A SELF-BALANCING ROTATABLE APPARATUS

(75) Inventor: Kevin J. Stalsberg, White Bear Lake, MN (US)

(73) Assignee: Honeywell International Inc., Morristown, NJ (US)

( * ) Notice: Subject to any disclaimer, the term of this patent is extended or adjusted under 35 U.S.C. 154(b) by 135 days.

(21) Appl. No.: 09/999,594

(22) Filed: Nov. 15, 2001

(65) Prior Publication Data

US 2003/0101812 A1 Jun. 5, 2003

(51) Int. Cl.[7] .............................................. G01H 17/00
(52) U.S. Cl. ......................... 73/570; 702/193; 702/196
(58) Field of Search .......................... 73/570, 579, 593, 73/660, 460; 702/189, 190, 191, 193, 194, 196; 68/12.06, 23.1, 23.2

(56) References Cited

U.S. PATENT DOCUMENTS

| | | | |
|---|---|---|---|
| 3,799,348 A | 3/1974 | Mazza | 210/144 |
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,694,156 A | 9/1987 | Swanberg | 250/214 |
| 4,991,247 A | 2/1991 | Castwall et al. | 8/158 |
| 5,150,314 A | 9/1992 | Garratt et al. | 364/571.02 |
| 5,280,660 A | 1/1994 | Pellerin et al. | 8/158 |
| 5,325,677 A | 7/1994 | Payne et al. | 68/12.04 |
| 5,376,063 A | 12/1994 | Greenstein | 494/37 |
| 5,490,436 A | 2/1996 | Coyne et al. | 74/573 |
| 5,561,993 A | 10/1996 | Elgersma et al. | 68/23.2 |
| 5,582,040 A | 12/1996 | Khan | 68/23.2 |
| 5,692,313 A | 12/1997 | Ikeda et al. | 34/58 |
| 5,715,731 A | 2/1998 | Koch | 74/573 |
| 5,729,025 A | 3/1998 | Erickson et al. | 250/574 |
| 5,731,868 A | 3/1998 | Okey et al. | 356/73 |
| 5,757,481 A | 5/1998 | O'Brien et al. | 356/243 |
| 5,761,932 A | 6/1998 | Kim | 68/23.2 |
| 5,761,933 A | 6/1998 | Kim et al. | 68/23.2 |
| 5,765,402 A | 6/1998 | Ikeda et al. | 68/12.06 |
| 5,800,628 A | 9/1998 | Erickson et al. | 134/18 |
| 5,850,748 A | 12/1998 | Kim et al. | 68/23.2 |
| 5,862,553 A | 1/1999 | Haberl et al. | 8/159 |

(List continued on next page.)

FOREIGN PATENT DOCUMENTS

EP  1 036 875 A2  9/2000  ............ D06F/39/08

*Primary Examiner*—Richard A. Moller
(74) *Attorney, Agent, or Firm*—Kris T. Frederick (57) ABSTRACT

A method and system for dynamically balancing a rotating system or rotating device utilizing data collection and correlation techniques to extract balance measures from sensor data is disclosed. Sensor data from the rotating system, containing information indicative of the dynamics of the rotating system, are filtered and sampled. A select time span of sampled data, adjusted upward to a nearest number of full revolutions of the rotating system, which is of sufficient size to extract balance measures, is collected. Data may be collected as a fixed number of samples per revolution, independent of a rotational speed, so as to simplify later computation. Several unique select time spans may be used for different ranges of rotational speeds so as to maintain the amount of data to be processed while still serving its original purpose. Window function may be applied to modify sampled data in the select time span so as to improve extraction performance. The fixed select time spans of sampled data provide for a fixed bandwidth correlation-based computation to extract desired balance measurements. The balance measures are used to assess the balance state of the rotating system and update control models so as to determine the proper course for balancing corrections necessary to dynamically place the rotating system in a balanced state.

20 Claims, 7 Drawing Sheets

U.S. PATENT DOCUMENTS

| | | | |
|---|---|---|---|
| 5,870,907 A | 2/1999 | Cho | 68/23.1 |
| 5,893,280 A | 4/1999 | Honda et al. | 68/12.06 |
| 5,913,951 A | 6/1999 | Herr et al. | 8/158 |
| 5,921,148 A | 7/1999 | Howell | 74/573 |
| 5,923,433 A | 7/1999 | Giuffre et al. | 356/440 |
| 5,957,144 A | 9/1999 | Neff et al. | 134/56 D |
| 5,960,804 A | 10/1999 | Cooper et al. | 134/56 D |
| 5,979,236 A | 11/1999 | Hong et al. | 73/458 |
| 6,007,640 A | 12/1999 | Neff et al. | 134/18 |
| 6,029,300 A | 2/2000 | Kawaguchi et al. | 8/159 |
| 6,047,428 A | 4/2000 | Min | 8/159 |
| 6,077,423 A | 6/2000 | Roy et al. | 210/121 |
| 6,082,151 A | 7/2000 | Wierzba et al. | 68/23.2 |
| 6,116,089 A * | 9/2000 | El-Ibiary et al. | 73/593 |
| 6,129,768 A | 10/2000 | Johnson et al. | 8/159 |
| 6,130,928 A | 10/2000 | Jamzadeh et al. | 377/23 |
| 6,144,447 A | 11/2000 | Ohman et al. | 356/246 |
| 6,148,647 A | 11/2000 | Kabeya et al. | 68/140 |
| 6,159,384 A | 12/2000 | Roberts et al. | 210/741 |

\* cited by examiner

Fig. 8

FIXED-BANDWIDTH CORRELATION WINDOW METHOD AND SYSTEM FOR A SELF-BALANCING ROTATABLE APPARATUS

RELATED APPLICATIONS

This application is related to co-pending and co-owned patent applications entitled 'Method and Apparatus for Reducing Microprocessor Speed Requirements in Data Acquisition Applications,' Honeywell Docket No. M10-01121, U.S. Ser. No. 09/792,996, filed on Feb. 26, 2001; 'Method and System for Detecting Fluid Injection from Stationary to Rotating Members,' Honeywell Docket No. M10-01128, U.S. Ser. No. 09/951,790, filed on Sep. 10, 2001; 'Simultaneous Injection Method and System for a Self-Balancing Rotatable Apparatus,' Honeywell Docket H16-26312, U.S. Ser. No. 09/896,763, filed on Jun. 29, 2001; 'Energy-Based Thresholds Applied to Dynamic Balancing,' Honeywell Docket No. H16-02079, U.S. Ser. No. 09/951,798, filed on Sep. 10, 2001; 'Dynamic Correlation Extension for a Self-Balancing Rotatable Apparatus' Honeywell Docket No. H16-26311, U.S. Ser. No. 09/951,932, filed on Sep. 10, 2001; 'Continuous Flow Method and System for Placement of Balancing Fluid on a Rotating Device Requiring Dynamic Balancing', Honeywell Docket H16-01112, U.S. Ser. No. 10/001,006, filed on Nov. 15, 2001; 'Dynamic Balancing Application Mass Placement', Honeywell Docket H16-01117, U.S. Ser. No. 10/001,090, filed on Nov. 15, 2001; 'Supervisory Method and System for Improved Control Model Updates Applied to Dynamic Balancing,' Honeywell Docket No. H16-02076, U.S. Ser. No. 10/011,218, filed on Nov. 15, 2001; 'Data Manipulation Method and System for a Self-Balancing Rotatable Apparatus,' Honeywell Docket No. H16-02078, U.S. Ser. No. 10/000,882, filed on Nov. 15, 2001; 'Resonance Identification Extension for a Self-Balancing Rotatable Apparatus,' Honeywell Docket No. H16-02080, U.S. Ser. No. 10/001,098, filed on Nov. 15, 2001; 'Method and System for Mechanizing Simultaneous Multi-Actuator Actions Applied to Dynamic Balancing,' Honeywell Docket No. H16-26313, U.S. Ser. No. 10/000,255, filed on Nov. 15, 2001.

The present invention relates generally to rotatable members that are able to achieve balanced conditions throughout a range of rotational speeds. The present invention also relates to methods and systems for dynamically balancing rotatable members through the continual determination of out of balance forces and motion to thereby take corresponding counter balancing action. The present invention additionally relates to methods and systems in which inertial masses are actively shifted within a body rotating on a shaft in order to cancel rotational imbalances associated with the shaft and bodies co-rotating thereon. The present invention additionally relates to methods and system that extract balance information from measured signals that are used in assessing the balance condition and determining the course of dybnamic balance control.

BACKGROUND OF THE INVENTION

When rotatable objects are not in perfect balance, non-symmetrical mass distribution creates out-of-balance forces because of the centrifugal forces that result from rotation of the object. This mass unbalance leads to machine vibrations that are synchronous with the rotational speed. These vibrations can lead to excessive wear and unacceptable levels of noise.

It is a common practice to balance a rotatable body by adjusting a distribution of moveable, inertial masses attached to the body. In general, this resulting state of balance may remain until there is a disturbance to the system. A tire, for instance, can be balanced once by applying weights to it and the tire will remain balanced until it hits a very big bump or the weights are removed. However, certain types of bodies that have been balanced in this manner will generally remain in balance only for a limited range of rotational velocities. One such body is a centrifuge for fluid extraction, which can change the degree of balance as speed is increased and more fluid is extracted.

Many machines are configured as freestanding spring mass systems in which different components thereof pass through resonance ranges during which the machine may become out of balance. Additionally, such machines may include a rotating body loosely coupled to the end of a flexible shaft rather than fixed to the shaft as in the case of a tire. Thus, moments about a bearing shaft may also be created merely by the weight of the shaft. A flexible shaft rotating at speeds above half of its first critical speed can generally assume significant deformations, which add to the imbalance. This often poses problems in the operation of large turbines and turbo generators.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which is difficult to measure), the small remaining "out-of-balance" will progressively apply greater force as the speed increases. This increase in force is due to the fact that F is proportional to $r\omega^2$, (F is the out of balance force and r is the radius of the rotating body and $\omega$ is its rotational speed).

The mass unbalance distributed along the length of a rotating body gives rise to a rotating force vector at the bearings that support the body. In general, the force vectors at respective bearings are not in phase. The rotating force vector may be opposed by a rotating reaction force, which can be transmitted to the bearing supports as noise and vibration. The purpose of active, dynamic balancing is to shift an inertial mass to the appropriate radial eccentricity and angular position for canceling the net mass unbalance. At the appropriate radial and angular distribution, the inertial mass can generate a rotating centrifugal force vector equal in magnitude and phase to the reaction force referred to above. Although rotatable objects find use in many different applications, one particular application is a rotating drum of a washing machine.

Many different types of balancing schemes are known to those skilled in the art. U.S. Pat. No. 5,561,993, which issued to Elgersma et al. on Oct. 22, 1996, and is incorporated herein by reference, discloses a self-balancing rotatable apparatus. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a clothes washing machine, which could not otherwise be accomplished if the motion of the machine were not measured. Such a method and system was operable in association with machines that are not rigidly attached to immovable objects, such as concrete floors. The algorithm disclosed by Elgersma et al.

permitted counterbalance forces to be calculated even when the rotating system (such as a washing machine), was located on a flexible or mobile floor structure combined with carpet and padding between the washing machine and a rigid support structure.

U.S. Pat. No. 5,561,993 thus described a dynamic balance control algorithm for balancing a centrifuge for fluid extraction. To accomplish balance control, sensor signals are filtered through correlation for balance measurements (i.e., magnitude and phase at the frequency component associated with the rotational speed) whose responses to balancing control actions are modeled and utilized to determine control actions that drive the system toward a balanced state. Such a system is generally time variant, such that the control models utilized therein may need to be routinely updated based on the measured response to a previous control action, which is a variation of perturbation theory, well known in the art.

In developing enhancements to the control algorithm explained in U.S. Pat. No. 5,561,993, it was observed that balance measurements were corrupted by low frequency modulations, especially noted at higher rotational speeds. An original filter implementation associated with U.S. Pat. No. 5,561,993 applied a fixed-number-of-revolutions rectangular window to the data, resulting in a decreased time span of data and an associated widening of the filter bandwidth as rotational speed was increased. This implementation resulted in poor isolation of the desired signal component at higher rotational speeds, thereby leading to corrupt balance measurements.

Assessing the balance state and creation of control models using corrupt balance measurements may lead to inadequate control actions. Based on the foregoing, it can be appreciated that this balance measurement related issue could lead to a limited degree of achievable balance, lengthy balancing times and the inability to obtain maximum spin speeds in centrifuge environments, such as, for example, a washing machine. Improved balance control and times can be achieved by addressing these issues. The invention described herein can overcome this balance measurement issue through the use of a fixed time span, and fixed bandwidth, correlation method and system in the correlation-based filtering of sensor signals.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

In accordance with addressing the shortcomings of the prior art, it is one aspect of the present invention to provide methods and systems in which rotatable members can achieve balanced conditions throughout a range of rotational speeds.

It is another aspect of the present invention to provide methods and systems for dynamically balancing rotatable members through the continual determination of out of balance forces and motion to thereby take corresponding counter balancing action.

It is yet another aspect of the present invention to provide methods and systems for measuring the dynamics of rotating systems and devices thereof in order to make corrections necessary to placing such systems or devices in a balanced condition.

It is still another aspect of the present invention to provide methods and systems for extracting balance measurements from sensor signals using correlation techniques, thereby determining the dynamics of rotating systems such that a balanced state is achieved in a shorter period of time.

In accordance with various aspects of the present invention, methods and systems are disclosed herein for dynamically balancing a rotating system utilizing fixed-bandwidth correlation techniques to define balance measurements from sensor signal data associated with the rotating system over its full range of operational speeds. The sensor signal data contains information indicative of the dynamics of the rotating system. This information is extracted through correlation techniques to provide balance measurements in the form of magnitude and phase of the frequency component associated with the rotational speed. The balance measurements can then be used to assess the balance state of the rotating system and update control models so as to determine the proper course for balancing corrections necessary to dynamically place the rotating system in a balanced state.

Initially, raw sensor data is low-pass filtered and then sampled. To simplify later computation, a fixed number of samples per revolution may be collected independent of the speed of rotation. This may be accomplished through variable-rate sampling or fixed-rate over-sampling and decimation strategies. A correlation operation is performed on a window of the sampled data to filter the desired balance measurements. The windowed data is an integer number of revolutions greater than or equal to 1. The time span of the windowed data is generally inversely proportional to the bandwidth of the filtering operation.

The present invention changes a correlation-based digital filter in that the time span of data no longer represents a fixed number of revolutions across all rotational speeds, with a decreasing time span as rotational speed increases. For the present invention, a fixed time span associated with the window of the data may be selected such that it is generally of sufficient size to establish a filter bandwidth that extracts the signal component of interest and attenuates lower frequency modulations associated with the rotating system. Thus, as rotational speed is increased, the number of revolutions of data in the window is increased. This can be based on a fixed reference window-time adjusted upward as a function of rotational speed to represent a minimum number of full revolutions of data samples extending beyond the reference time. The reference time may be selected larger than the period of low frequency modulations to be eliminated.

Additionally, several fixed time span windows may be designated, wherein each may be utilized for a range of rotational speeds for which it provides adequately small filtering bandwidth. Employing window functions multipliers different from the rectangular function, on the designated time span of data, will further assist to drastically reduce filter side-band ripple.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention involves the formulation of a general model to predict the location of an out-of-balance occurrence based on known perturbations at predetermined locations of a rotatable member. The basic configuration and concepts explained in U.S. Pat. No. 5,561,993 are discussed herein, but do not limit the scope of the present invention, including preferred embodiments discussed herein. Features taught in U.S. Pat. No. 5,561,993 are discussed herein for illustrative purposes only, in order to explain the foundation from which the present invention was derived. Those skilled in the art can appreciate that such features, including figure, text, descriptions, equations and tables thereof do not limit the scope of the present invention.

Figure 1:
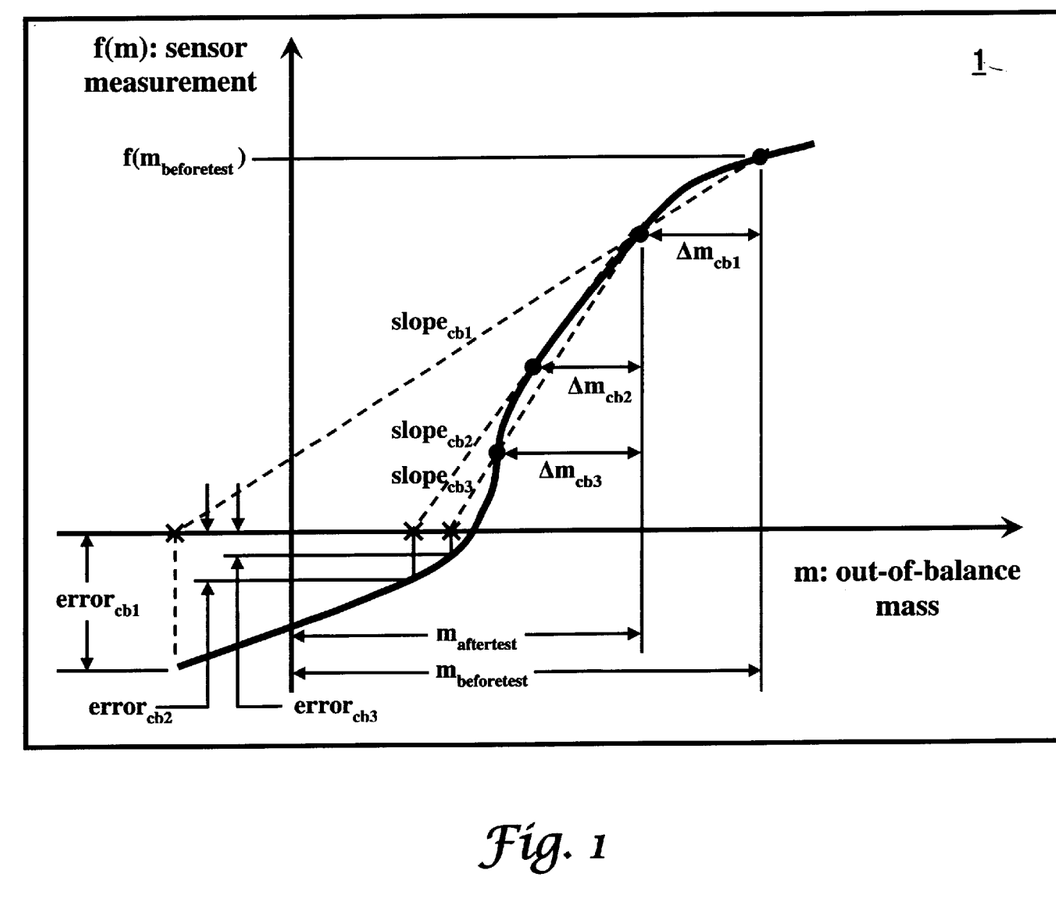
FIG. 1 depicts a plot of a non-linear system, in accordance with preferred embodiments of the present invention.

FIG. 1 depicts a plot of a non-linear system 1, in accordance with preferred embodiments of the present invention. Given a very simple (e.g., one-dimensional) non-linear system, such as the non-linear system in FIG. 1, the system can be balanced when the sensor measurement, f(m), is driven to zero. The objective of such a system is to find a value for a counterbalance $\Delta m$, such that the sensor measurement f(m) is driven to zero, i.e., f(m)=0. Utilizing a Taylor's series expansion in the vicinity of the anticipated operating range and neglecting second order and higher terms, one can generate a linear model of the form y=b+mx. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \quad (1)$$

Those skilled in the art can appreciate that f($m_{next}$) represents the desired sensor measurement. In addition, f($m_{aftertest}$) can represent the sensor measurement after a test or a prior balance-control action. The variable m generally represents the out-of-balance in the system. For example, the variable $m_{aftertest}$ generally represents the out-of-balance after a test action ($\Delta m_{test}$), and the change in m (i.e., $\Delta m = m_{next} - m_{aftertest}$) is the counterbalance required to achieve a desired sensor measurement, (f($m_{next}$)=0). The control action involves progressively moving in the direction of the estimated counterbalance and updating the system model and the required counterbalance estimate as control progresses. Those skilled in the art can appreciate that this control implementation of equation 1 represents the well-known Newton Raphson iteration method.

Since the objective is to find f($m_{next}$)=0, the general form of equation 1 reduces to:

$$m_{next} = m_{aftertest} - \left[\frac{\partial f(m)}{\partial m}\right]^{-1} \cdot f(m_{aftertest}) \quad (2)$$

where $m_{next}$ is the solution or system out-of-balance needed to make f($m_{next}$)=0 or to drive the sensor measurement to zero. Thus, the estimated mass change $\Delta m_{cb}$ generally required for counterbalance action is illustrated in equation 3.

$$\Delta m_{cb} = m_{next} - m_{aftertest} = -f(m_{aftertest}) / \left(\frac{\partial f}{\partial m}(m_{aftertest})\right) \quad (3)$$

The partial derivative, or slope of the sensor function, can be found by perturbing the system. This may be generally illustrated in equation 4, which represents the change in sensor measurements due to a test action ($\Delta m_{test} = m_{aftertest} - m_{beforetest}$).

$$\frac{\partial f}{\partial m}(m_{aftertest}) = \frac{f(m_{aftertest}) - f(m_{beforetest})}{m_{aftertest} - m_{beforetest}} \quad (4)$$

Combining equations 3 and 4 may result in the generalized form shown in equation 5; this equation is generally expressed in an expanded notion of multiple inputs and outputs.

$$[f(m_{aftertest})] = -\left[\frac{\partial f(m)}{\partial m}\right] \cdot [\Delta m_{cb}] \quad (5)$$

Regarding the linear models and associated slope calculation in FIG. 1, it can be appreciated that a change in the mass may result in a change in the system, and the system itself may be nonlinear; thus, the linear model used to determine the next counterbalance may have significant error. Therefore, when applying the Newton Raphson iteration to a process, certain requirements should be followed. First, the initial approximation should be sufficiently accurate to result in subsequent operation near the desired solution. Also the measurement f(m) should be smooth, nearly linear and single-valued in the vicinity of the anticipated operation. Additionally, because higher derivatives are neglected in this type of approximation, the higher derivatives should be small, so as to avoid convergence problems.

Lastly, in applications of the Newton Raphson iteration, only one solution (counterbalance mass $\Delta m_{cb}$) should exist for the sensor measurement's being equal to zero. This means there is only one root. Even after following the above requirements, system noise may be a concern. In the hypothetical illustration of FIG. 2, a larger initial test action, which changes the system to point C, is preferable to the one that changes it to point B. This result can be illustrated by comparing the slopes of lines 22, 24 and 26, that result from the various test actions (perturbations) depicted in FIG. 2. The difference between the "before" and "after" test sensor measurements should be large enough to obtain a good approximation of the slope of the function and ensure that the resulting change in the measurement dominates the changes due to system noise.

Figure 3:
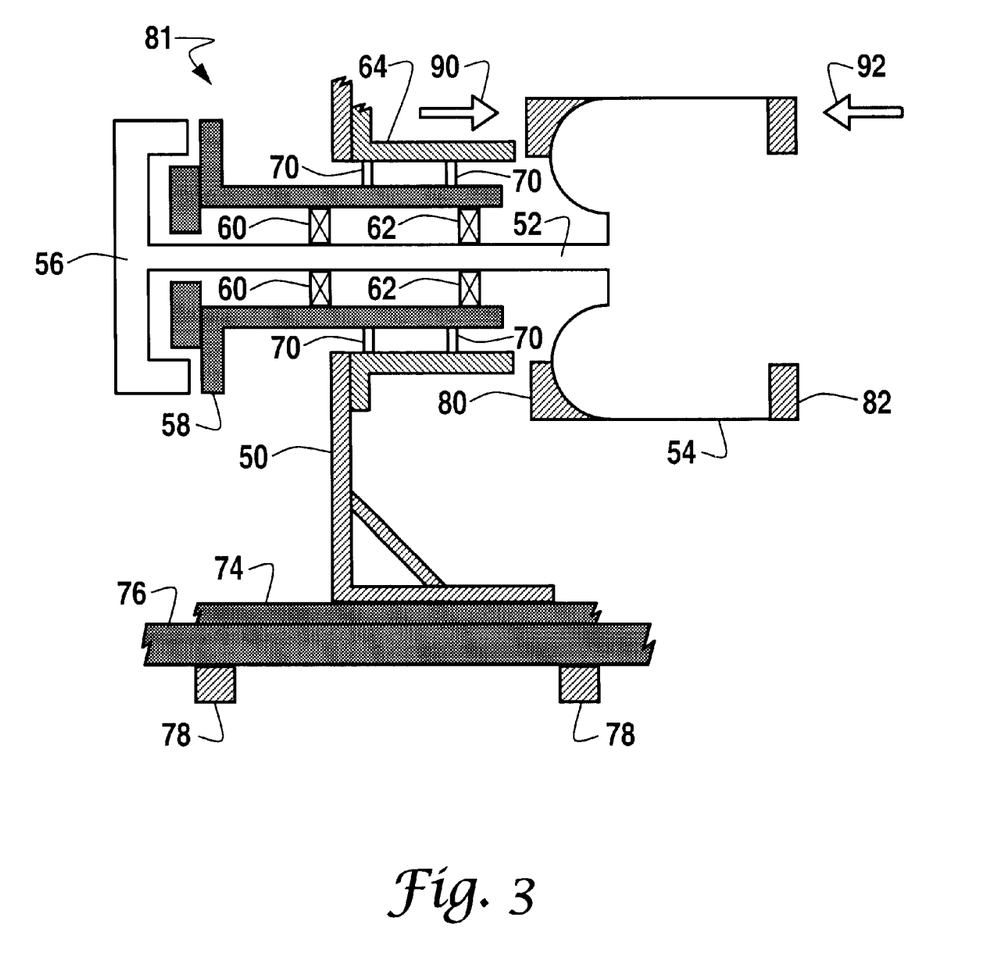
FIG. 3 is a schematic representation of a washing machine, which may be adapted for use in association with the present invention.

FIG. 3 depicts a schematic representation of a clothes washing machine 81, which may be adapted for use in association with the present invention. Washing machine 81 is one type of a washing appliance that may be implemented in accordance with the method and system of the present invention. Those skilled in the art can appreciate that the present invention may be implemented within a rotating device or rotating system, such as, for example, a washing machine. Those skilled in the art can further appreciate, however, that other types of rotating systems or rotating devices may be utilized in accordance with the present invention. Note that as utilized herein, the terms "rotating system," "rotating device," "rotating apparatus," "rotatable apparatus," "rotatable system," or "rotatable device" may be utilized interchangeably. The methods and systems of the present invention may be implemented to balance rotating systems, rotating devices or rotating members thereof.

In the example of FIG. 3, a rotatable drum 54 includes a plurality of schematically illustrated back cups 80 and front cups 82. Both the back and front cups 80 and 82 may be disposed at axial ends of the rotatable drum 54 and, although not shown in FIG. 3, both the back and front cups 80 and 82 can comprise a plurality of cups dispersed around the periphery of rotatable drum 54. A quantity of water can be injected into back cups 80 and/or front cups 82 from a stationary control valve supplied with water, such as those identified by reference numerals 90 and 92. This water injection to the cups is the basic mechanism of dynamic balancing in the embodiment described in FIG. 3. Although the terms "test mass" or "fluid injection" may be used to describe the preferred embodiment, those skilled in the art can appreciate that such a test or control action may be comprised of many different materials, and the invention is not limited to fluid-based injection methodologies for placing mass.

FIG. 3 thus schematically illustrates a washing machine 81 comprising a frame 50, a shaft 52 and a rotatable drum 54. Shaft 52 may be attached to rotatable drum 54. These two components can be attached to a rotor or pulley 56 of a motor drive. Frame 50 can provide support for a bearing housing 58 in which bearings, 60 and 62, are generally supported. A housing mount 64 can support bearing housing 58. A plurality of sensors identified by the reference numeral 70 are illustrated between the housing mount and the bearing housing in FIG. 3. These sensors will be described in greater detail below. Beneath frame 50 are generally shown a carpet and pad 74, a plywood support member 76 and a plurality of joists 78. The representation shown in FIG. 3 illustrates a typical application of a horizontal clothes washing machine in a residential housing environment. Those skilled in the art can appreciate that FIG. 3 is presented for illustrative purposes only and that a variety of washing machine configurations and other rotating devices not illustrated herein may be utilized to implement varying embodiments of the present invention. Washing machine 81 is thus described herein for illustrative purposes only and is not considered a limiting feature of the present invention.

Figure 2:
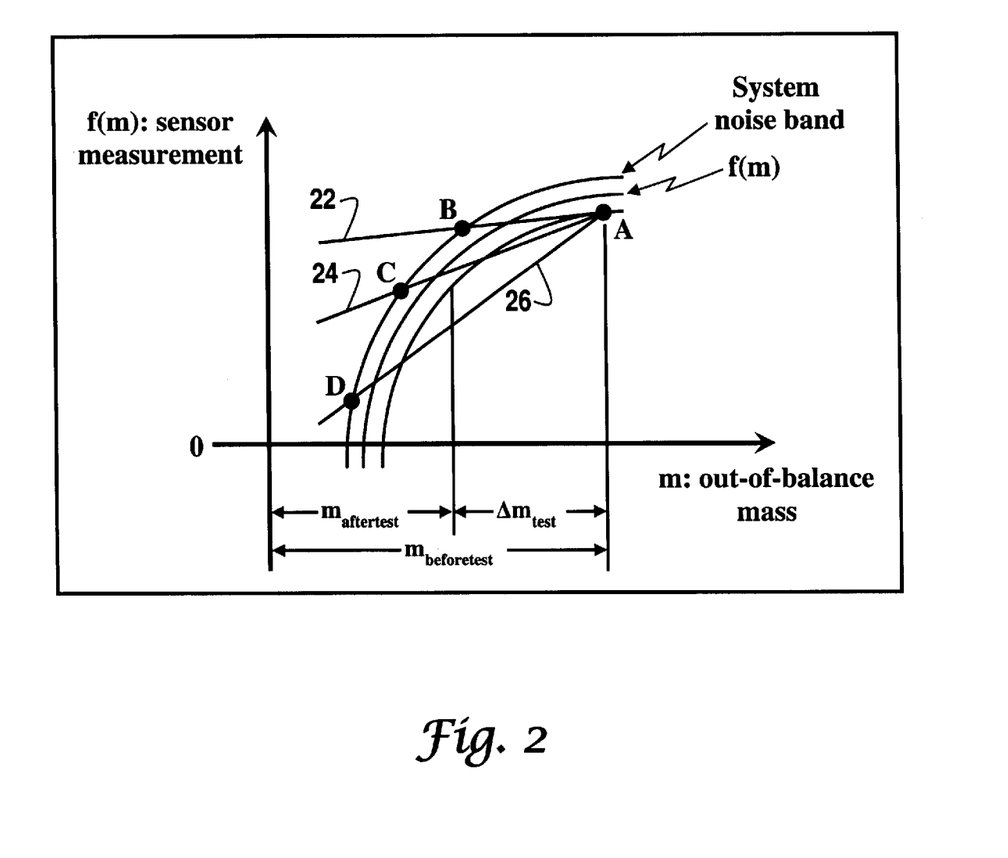
FIG. 2 is a graphical representation of a nonlinear system and the effect of system noise with which the present invention must be concerned.
Figure 5:
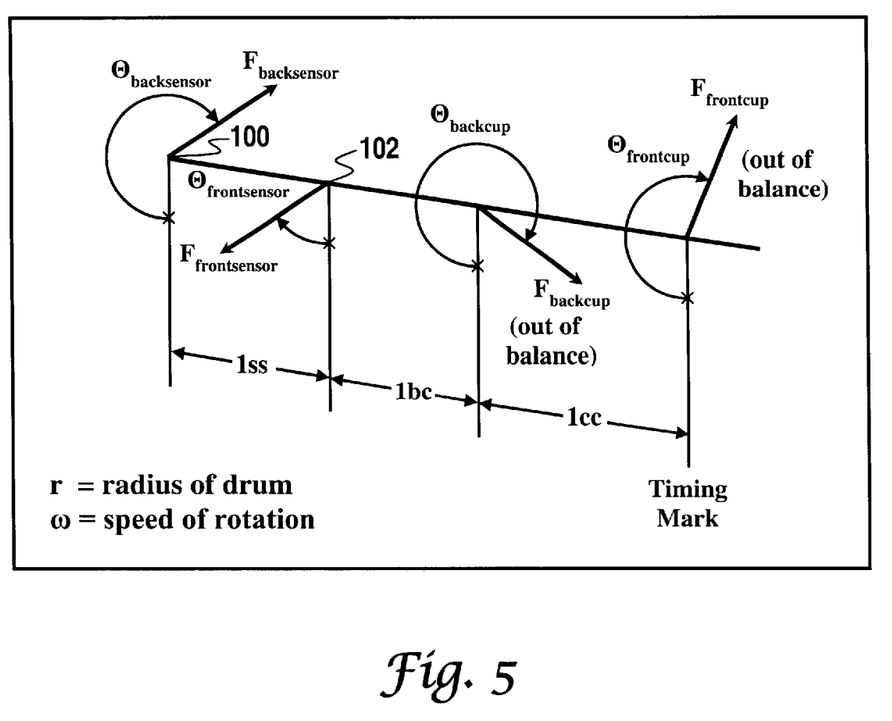
FIG. 5 depicts a three-dimensional schematic representation of the forces and critical lengths along an axis of rotation, which has been extended along a length of the shaft and through a length of the drum.

FIG. 5 illustrates a three dimensional schematic representation of the forces and critical lengths along the axis of rotation, which has been extended along the length of the shaft and through the length of the drum. Force sensors may be mounted to measure the force transmitted between housing mount 64 and bearing housing 58, as illustrated in FIG. 2. The basic concept of dynamic balancing stipulates that vector forces at the front and back cups may represent an out-of-balance condition. Referring to FIG. 5, the system may be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so that the resultant force vectors along multiple axes of the system can be determined at each of the first and second locations, 100 and 102, of the axis of rotation.

If a washing machine or similar apparatus with a rotating member is rigidly attached to a stationary object, such as a concrete floor, a mere force and moment analysis based on forces and moment arms shown in FIG. 5 would be appropriate. This analysis would thus yield sufficient information to allow counterbalance forces to be implemented in a manner that would achieve a balance of a rotating drum 54. However, in most practical residential housing applications the machine is not rigidly attached to an immovable object and, instead, may be associated with a plurality of flexible members. Therefore, it is not practical to expect a machine of this type to be installed and operate without motion being experienced by the various portions of the machine.

Figure 4:
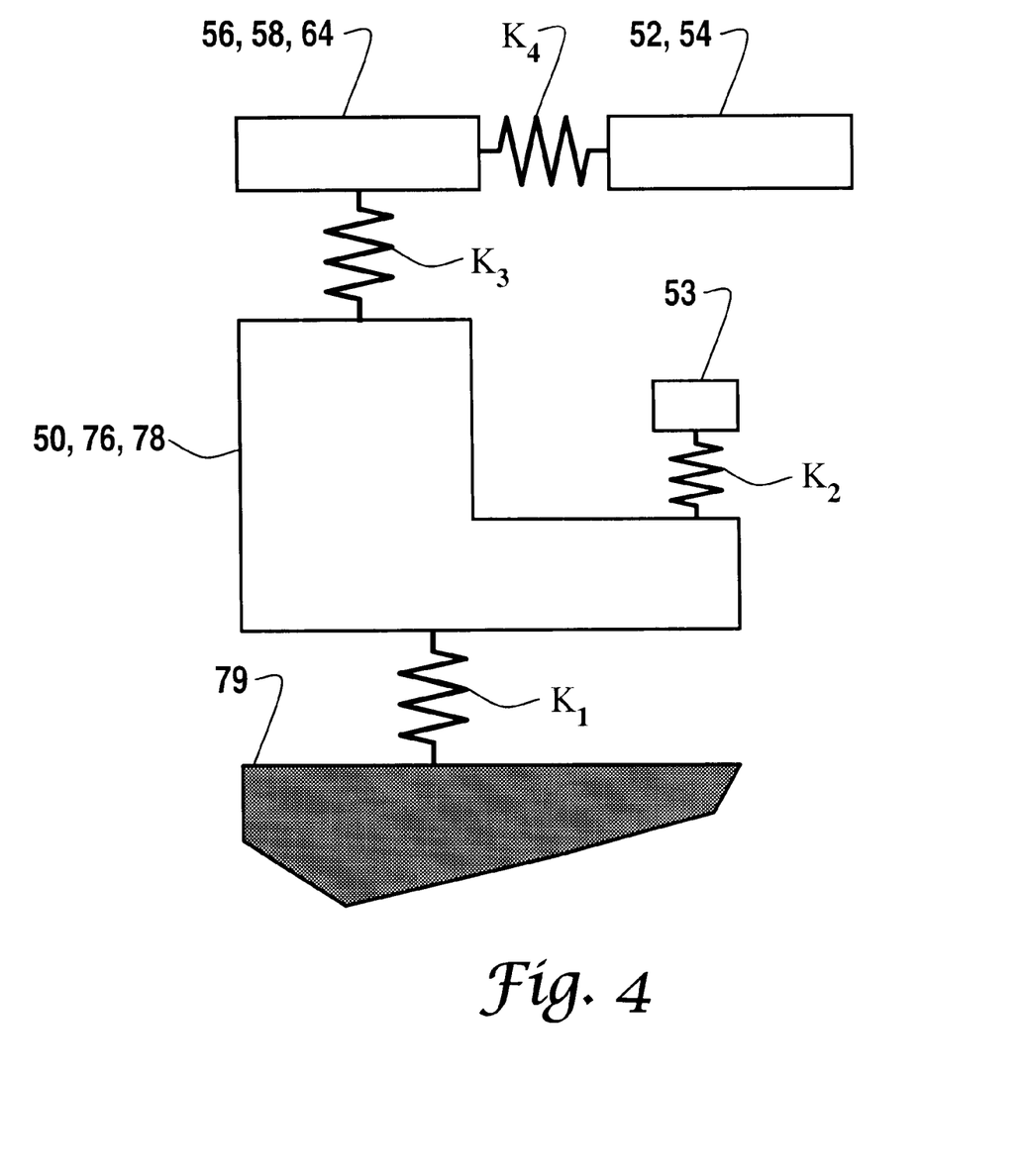
FIG. 4 is a spring and mass illustration depicting the manner in which a nonrigid washing machine can behave if mounted on nonrigid structures.

FIG. 4, depicts a schematic representation of a type of arrangement usually encountered in clothes washing machine applications. FIG. 4 thus illustrates a spring and mass system depicting the manner in which a nonrigid washing machine can behave if mounted on nonrigid structures.

The behavior of frame 50 in relation to footing 79 can be described as a spring connecting the frame 50 and floor 76 to the footing 79 and having a spring constant K1. The relationship between a tub 53 (not shown in FIG. 3) surrounding the rotatable drum 54 and frame 50 can be described by a spring constant K2. A spring constant K3 represents the relationship between bearing housing 58 and housing mount 64, and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring sub-systems that define the relationships among major components of the overall system. FIG. 4 demonstrates that the relationships between these components are not rigid and, as a result, can permit motion, resulting in accelerations, to occur in response to forces exerted on the various components. Therefore, measuring only the forces at sensors 70 shown in FIG. 3 would make accurate counterbalance determinations extremely difficult, if not impossible. Thus, it may be beneficial to measure motion relative to a footing or inertial space (e.g., acceleration) and account for it in the analysis of forces.

Figure 6:
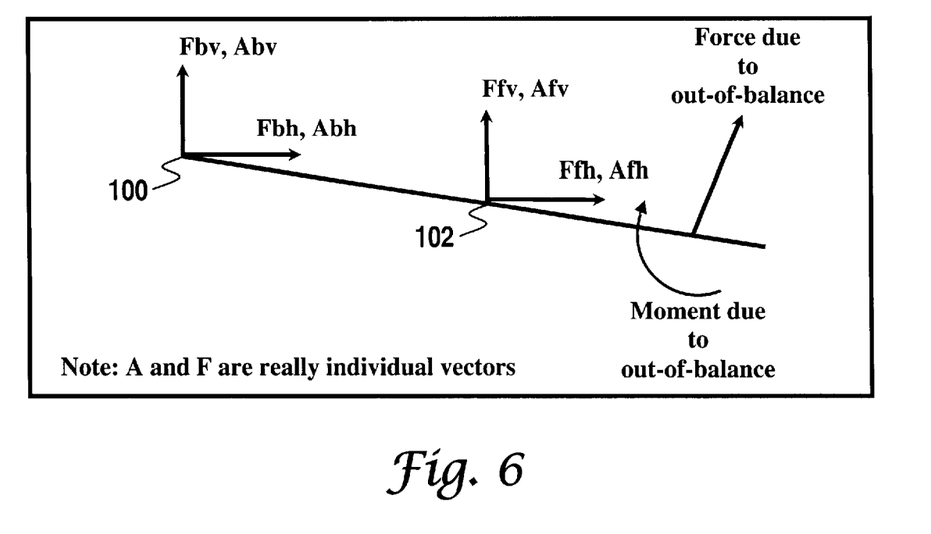
FIGS. 6 and 7 depict a graphical representation of a shaft with measured force and motion parameters.
Figure 7:
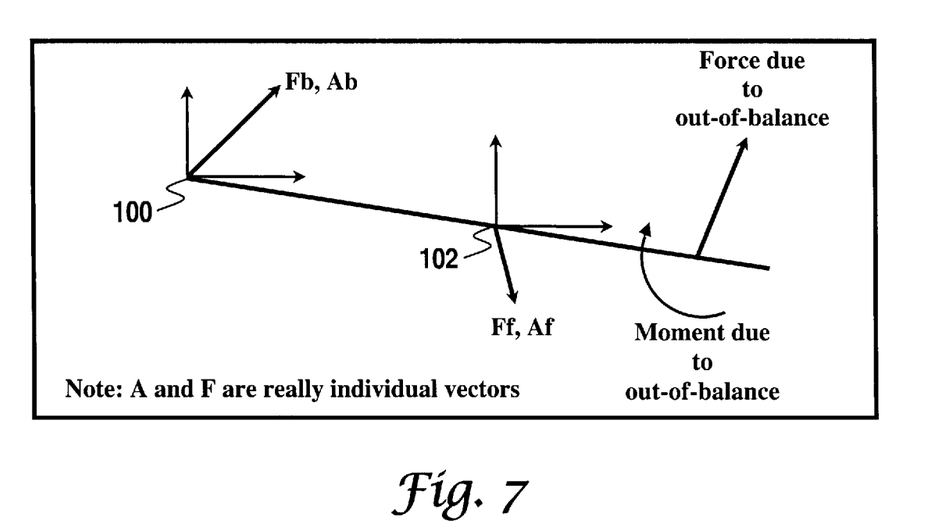

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations, 100 and 102, the effects of rotating out-of-balance forces are determined along the horizontal (h) and vertical (v) coordinates. Those skilled in the art can appreciate that the coordinates shown in FIGS. 6 and 7 illustrate the fact that the concepts taught in U.S. Pat. No. 5,561,993 and the present invention operate with information describing the forces and accelerations (motions) in terms of a magnitude along a fixed direction and an associated rotating drum angle.

TABLE I

| VARIABLE | DESCRIPTION |
|---|---|
| Inputs | |
| $\Delta m_{front\_cb}$ | test counterbalance mass placed in the front plane (vector) |
| $\Delta m_{back\_cb}$ | test counterbalance mass placed in the back plane (vector) |
| $\omega_{back}$ | speed of rotation in (rad/sec) at which the back plane test counterbalance occurred |
| $\omega_{front}$ | speed of rotation in (rad/sec) at which the front plane test counterbalance occurred |
| r | radius of counterbalance placement (inches) |
| $\omega$ | current speed of rotation |
| Outputs | |
| $f_{back}$ | back force sensor (lbf) (vector) |
| $f_{front}$ | front force sensor (lbf) (vector) |
| $a_{back}$ | back accelerometer sensor (in/sec$^2$) (vector) |
| $a_{front}$ | front accelerometer sensor (in/sec$^2$) (vector) |
| Actions | |
| $m_{backplane\_cb}$ | estimated backplane counterbalance to drive sensor readings to zero (vector) |
| $m_{frontplane\_cb}$ | estimate frontplane counterbalance to drive sensor readings to zero (vector) |

For the following discussion, Table I illustrates the inputs and outputs utilized in the multi-input/multi-output condition relating to the invention described in U.S. Pat. No. 5,561,993. In order to find the appropriate solutions for the counterbalance forces described above, measured forces and accelerations should be considered in the balancing of system forces and moments. As described above, the counterbalance masses, forces and accelerations represent magnitudes and angles. Therefore, all variables shown in Table I, except r and ω, generally comprise both a magnitude and an angle in polar coordinates, which can be converted to complex coordinates. The relationship described in equation 5 above can be rewritten for the multi-input/multi-output case using the terms described in Table I. The result is four coupled simultaneous equations, incorporating the effects of perturbations in both front and back planes that could have occurred at rotational speeds slightly different from the current speed. These four relationships are shown below and identified as equation 6.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb} \quad (6)$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{front3} - a_{front2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{front4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

The four mathematical relationships illustrated in equation 6 above can be grouped together and treated as a matrix equation in the following discussion. The meanings of the subscripts in equation 6 above are identified in Table II.

TABLE II

| SUBSCRIPT | MEANING |
|---|---|
| 0 | measurement prior to back plane counterbalance test mass $\Delta m_{back\_cb}$ |
| 1 | measurement after back plane counterbalance test mass $\Delta m_{back\_cb}$ |
| 2 | measurement prior to front plane counterbalance test mass $\Delta m_{front\_cb}$ |
| 3 | measurement after front plane counterbalance test mass $\Delta m_{front\_cb}$ |
| 4 | current sensor measurement |

The relationships shown above in equation 6 can be applied to equation 5 in matrix form as:

$$\begin{bmatrix} a_{back4} \\ a_{front4} \\ f_{back4} \\ f_{front4} \end{bmatrix} = \quad (7)$$

$$-\begin{bmatrix} \dfrac{a_{back1} - a_{back0}}{r \cdot \omega_{back}^2 \Delta m_{back\_cb}} & \dfrac{a_{back3} - a_{back2}}{r \cdot \omega_{front}^2 \Delta m_{front\_cb}} \\ \dfrac{a_{front1} - a_{front0}}{r \cdot \omega_{back}^2 \Delta m_{back\_cb}} & \dfrac{a_{front3} - a_{front2}}{r \cdot \omega_{front}^2 \Delta m_{front\_cb}} \\ \dfrac{f_{back1} - f_{back0}}{r \cdot \omega_{back}^2 \Delta m_{back\_cb}} & \dfrac{f_{back3} - f_{back2}}{r \cdot \omega_{front}^2 \Delta m_{front\_cb}} \\ \dfrac{f_{front1} - f_{front0}}{r \cdot \omega_{back}^2 \Delta m_{back\_cb}} & \dfrac{f_{front3} - f_{front2}}{r \cdot \omega_{front}^2 \Delta m_{front\_cb}} \end{bmatrix} \cdot \begin{bmatrix} m_{backplane\_cb} \\ m_{frontplane\_cb} \end{bmatrix} \cdot r \cdot \omega^2$$

where we describe this matrix equation as being in the form b=Ax and $$A = -\frac{\partial f(m)}{\partial m} = -\begin{bmatrix} \dfrac{a_{back1} - a_{back0}}{r \cdot \omega_{back}^2 \cdot \Delta m_{back\_cb}} & \dfrac{a_{back3} - a_{back2}}{r \cdot \omega_{front}^2 \cdot \Delta m_{front\_cb}} \\ \dfrac{a_{front1} - a_{front0}}{r \cdot \omega_{back}^2 \cdot \Delta m_{back\_cb}} & \dfrac{a_{front3} - a_{front2}}{r \cdot \omega_{front}^2 \cdot \Delta m_{front\_cb}} \\ \dfrac{f_{back1} - f_{back0}}{r \cdot \omega_{back}^2 \cdot \Delta m_{back\_cb}} & \dfrac{f_{back3} - f_{back2}}{r \cdot \omega_{front}^2 \cdot \Delta m_{front\_cb}} \\ \dfrac{f_{front1} - f_{front0}}{r \cdot \omega_{back}^2 \cdot \Delta m_{back\_cb}} & \dfrac{f_{front3} - f_{front2}}{r \cdot \omega_{front}^2 \cdot \Delta m_{front\_cb}} \end{bmatrix} \quad (8)$$

Equations 6, 7 and 8 depict the mathematical model generally described in U.S. Pat. No. 5,561,993. This mathematical model is formulated such that the dynamics of the system are divided into two columns based on whether mass is placed in the front plane (i.e., column 2) or the back plane (i.e., column 1) of the spinner. The present invention disclosed herein may be used with this control model or like extensions, the more general solution of which allows for the placement of mass in both the front and the back plane simultaneously to formulate the control model and apply control actions and covers the case where more than two inputs to the system may be utilized.

The equation relationships shown in equation 7 can be rewritten in matrix format to solve for the counterbalance masses, $m_{backplane\_cb}$ and $m_{frontplane\_cb}$, required to bring the system into balance in the same manner as described in U.S. Pat. No. 5,561,993. For the case of four sensors and using the A matrix of equation 8, this can be expressed through equation 9 as:

$$r \cdot \omega \cdot \begin{bmatrix} m_{\text{backplane\_cb}} \\ m_{\text{frontplane\_cb}} \end{bmatrix} = -A^+ \cdot \begin{bmatrix} a_{back} \\ a_{front} \\ f_{back} \\ f_{front} \end{bmatrix} \quad (9)$$

In a situation such as that described by equation 9 above, 4 sensor values (i.e., two accelerations and two forces) are known from measurements and two counterbalance forces are unknown. This results in a situation where there are more equations than unknowns as each sensor provides an equation and there are only two unknown counterbalance forces for the front and back planes of the drum. This condition describes an over-determined system. An over-determined system may have more than one possible solution and a technique is generally required to solve for more equations than unknowns in an optimal manner.

A technique for solving equations of this type in a balancing scheme should find a solution that minimizes all of the sensor readings and also minimizes the amount of counterbalance media required to balance the rotating system. In other words, the force sensors and the accelerometers should all be driven as close to zero as possible by the selected counterbalances and the total amount of counterbalance media (i.e., fluid or mass) applied should be minimized.

Those skilled in the art can appreciate that a mathematical technique which may solve this problem involves computation of the pseudo-inverse of the A matrix ($A^+$) utilizing the singular value decomposition (SVD) technique. This solution method finds the optimal solution to the over-determined system shown in equation 9. The SVD is one of several techniques that can support the pseudo-inverse calculation for control. It can provide optimal control for both inputs and outputs of the modeled system. Other variations of the components that make up the SVD may be used alone but would not provide both input and output optimization. This procedure is fully described in U.S. Pat. No. 5,561,993 and is well known to those skilled in the art. It is also described in significant detail in various reference linear algebra textbooks.

After generating the solution to equation 9, it may be necessary to formulate a practical approach to applying the counterbalance mass to the rotating member and then evaluating the member to verify that the control action had the desired balancing affect. An approach to applying counterbalance and verifying the control action effect is fully described in U.S. Pat. No. 5,561,993, which is incorporated herein by reference. Those skilled in the art can appreciate that the approaches to applying counterbalance and verifying the control action effect, which were disclosed in U.S. Pat. No. 5,561,993, do not limit the scope of the present invention. The features, techniques, methods and systems disclosed in U.S. Pat. No. 5,561,993 are described herein for illustrative and background purposes only.

To accomplish balance control, balance control actions may place mass at the periphery of axial control planes on the centrifuge. Sensor measurements may be used to assess the immediate balance conditions through the use of measurement thresholds, established to direct the course of balance control. Measurements of the forces and motions at various locations within the rotatable apparatus are made before and after each control action and may be used to update the control model described by equations 7 through 9. That updated model along with further sensor measurements may be utilized to determine a prediction of the next required counterbalance control action. This process continues until balance condition is achieved (i.e., all sensor values below balance threshold) at full operating speed.

Relevant to the sensing aspect of the present invention is the fact that the forces and accelerations of interest are actually rotating vectors. That is, they are fixed with respect to the rotating members of the system and rotate at the rotational speed with respect to the stationary members of the system. Thus, the desired information has a constant magnitude and angle regarding the rotating reference frame of the rotational members that is then superimposed by a periodic component regarding the stationary reference frame that supports the rotating members. In the preferred embodiment described above, sensors for obtaining this information can be attached to the stationary members, as illustrated in FIGS. 3 and 5. It is important to understand that the present invention is not limited to this particular sensor attachment. Depending on the dynamics of the system, not only could sensors be located on other parts of the stationary members, but may also be mounted on parts of the rotating members of the system.

The signals from the sensor measurements may be comprised of a sinusoidal waveform with a constant offset bias and corrupted by measurement noise as well as harmonically-related system noise. The signal component of interest is the sinusoidal component at the frequency matching the speed of rotation. Known data acquisition techniques can be used to acquire the data in a digital format, including AC coupling to eliminate the constant offset bias, amplification as needed, and low pass filtering to prevent aliasing in the sampled data. To simplify later computation, a fixed number of samples per revolution may be collected independent of the speed of rotation. This may be accomplished through variable-rate sampling or fixed-rate over-sampling and decimation strategies. Additional corruption of the sensor signals may then be eliminated with a narrow bandpass function that is tunable in real time to the speed of rotation. The bandpass function also rejects external disturbances that can occur at frequencies other than the rotating frequency. The outputs of the bandpass function are the desired magnitudes and angles that may represent the balance measurements.

The bandpass function may be accomplished through a correlation operation. Equation 10 shows the sensor signal s(t) correlated with a cosine and a sin function that are synchronized with the position and rotational speed of the rotating member, i.e., one rotation is one period with 0° at a mark on the rotating member.

$$\phi_{s,\cos}(t) = \int_{-\infty}^{\infty} s(t+\tau)\cos(\omega_o \tau) d\tau \quad (10)$$

$$\phi_{s,\sin}(t) = \int_{-\infty}^{\infty} s(t+\tau)\sin(\omega_o \tau) d\tau$$

Only computation of $\phi_{s,\cos}(t)$ and $\phi_{s,\sin}(t)$ at t=0 (t representing the time shift between s(τ) and the reference sinusoid, rather than absolute time) is required. Equation 11 shows the two single point (t=0) computations can then be combined to get the amplitude, A, and phase, θ, of the sinusoidal component of s(t) that is at the frequency of rotation, $\omega_o$, i.e., the balance measurement.

$$A = f_1(\phi_{s,cos}(0), \phi_{s,sin}(0))$$

$$\theta = f_2(\phi_{s,cos}(0), \phi_{s,sin}(0)) \quad (11)$$

This technique of computing two single point correlation values and combining them for the result, reduces the computation and memory involved versus performing the convolution integral to a point where A and θ could be determined from either $\phi_{s,cos}(t)$ or $\phi_{s,sin}(t)$ alone.

The filtering properties or the correlation operation are best shown in the frequency domain. Consider the Fourier transformations of s(t) and the reference sinusoids into the frequency domain as shown in equation 12; where δ( ) is the impulse function and j is square root of −1.

$$s(\tau) \xrightarrow{F} S(\omega)$$

$$s(t+\tau) \xrightarrow{F} e^{j\omega t} S(\omega)$$

$$\cos(\omega_o \tau) \xrightarrow{F} \pi[\delta(\omega - \omega_o) + \delta(\omega + \omega_o)] = Y_1(\omega)$$

$$\sin(\omega_o \tau) \xrightarrow{F} \frac{\pi}{j}[\delta(\omega - \omega_o) - \delta(\omega + \omega_o)] = Y_2(\omega) \quad (12)$$

Utilizing the Fourier transform property that correlation in the time domain is multiplication in the frequency domain as shown in equation 13 ($Y^*(\omega)$ is the complex conjugate of $Y(\omega)$), and allowing s(t) and S(ω) to be whatever they will, results in the frequency domain correlation results shown in equation 14.

Correlation Integral & Fourier Transform Property $$\int_{-\infty}^{\infty} x(t+\tau) y(\tau) d\tau = \phi_{yx}(-t) = \phi_{xy}(t) \xrightarrow{F} \Phi_{xy}(\omega) = X(\omega) Y^*(\omega) \quad (13)$$

$$\Phi_{s,cos}(\omega)|_{t=0} = S(\omega) Y_1^*(\omega) = A e^{j\theta} \pi[\delta(\omega - \omega_o) + \delta(\omega + \omega_o)]$$

$$\Phi_{s,sin}(\omega)|_{t=0} = S(\omega) Y_2^*(\omega) = A e^{j(\theta + \pi/2)} \pi[\delta(\omega - \omega_o) - \delta(\omega + \omega_o)] \quad (14)$$

where $A = |S(\omega)|\|_{\omega = \pm \omega_o}$ is the amplitude, and $\theta = \angle S(\omega)|_{\omega = \pm \omega_o}$ the phase, of the $\omega_o$ component of s(t).

The Fourier Transform pairs show in equation 12 for cosine and sine can now be applied in the inverse direction to $\phi_{s,cos}(\omega)$ and $\phi_{s,sin}(\omega)$ from equation 14, and evaluated for t=0, to give the results shown in equation 15.

$$F^{-1}\{\Phi_{s,cos}(\omega)\}\big|_{t=0} \xrightarrow{F} A\cos\theta = \phi_{s,cos}(t)\big|_{t=0}$$

$$F^{-1}\{\Phi_{s,sin}(\omega)\}\big|_{t=0} \xrightarrow{F} -A\sin\theta = \phi_{s,sin}(t)\big|_{t=0} \quad (15)$$

So, the single point (t=0) correlation of the sensor signal with cosine and sine reference signals, gives two measures as shown in equation 16.

$$m_1 = A \cos\theta$$

$$m_2 = -A \sin\theta \quad (16)$$

To extract the desired A and θ balance measures from $m_1$ and $m_2$ of equation 16, trigonometric identities can be utilized. Equation 17 refines the relations stated in equation 11 and the desired values can be extracted.

$$A = f_1(m_1, m_2) = (m_1^2 + m_2^2)^{1/2}$$

$$\theta = f_2(m_1, m_2) = \tan^{-1}(m_2/m_1) \quad (17)$$

These balance measures represent the signal component of interest, i.e., the sinusoidal component at the frequency matching the speed of rotation, as shown in equation 18.

$$\hat{s}(t) = A \cos(\omega_o t + \theta) \quad (18)$$

The development beginning at equation 10 assumes signals are available across infinity, when the reality is that a limited window of data whose time span is an integer number of revolutions greater than or equal to 1, is available and best for reasonable correlation computations. The affects of windowed data may be described as making the impulse functions of equation 14, less ideal. Instead of picking out a specific $\omega_o$ component, you get a small band of frequencies about the $\omega_o$ term. To develop this affect, the window function must be incorporated as a product term in the correlation integral of equation 10. The point relevant to the present invention is that the smaller time span of data used in computing the correlation integral, the wider the band of frequencies about $\omega_o$ that are allowed into the computed balance measures.

In developing enhancements to the control algorithm explained in U.S. Pat. No. 5,561,993, it was observed that balance measurements were corrupted by low frequency modulations, especially noted at higher rotational speeds. An original filter implementation associated with U.S. Pat. No. 5,561,993 applied a fixed-number-of-revolutions rectangular window to the data, resulting in a decreased time span of data and an associated widening of the filter bandwidth as rotational speed was increased. This implementation resulted in poor isolation of the desired signal component at higher rotational speeds, thereby leading to corrupt balance measures. Assessing the balance state and creation of control models using corrupt balance measurements may lead to inadequate control actions; leading further to a limited degree of achievable balance, lengthy balancing times and the inability to obtain maximum spin speeds.

The present invention improves upon previous implementations of the correlation-based filtering for balance control applications in that the time span of data no longer represents a fixed number of revolutions across all rotational speeds. For the present invention, a fixed time span associated with the window of the data may be selected such that it is generally of sufficient size to establish a filter bandwidth that extracts the signal component of interest and attenuates lower frequency modulations associated with the rotating system. Thus, as rotational speed is increased, the number of revolutions of data in the window is increased. This can be based on a fixed reference window-time adjusted upward as a function of rotational speed to represent a minimum number of full revolutions of data samples extending beyond the reference time. The reference time may be selected larger than the period of low frequency modulations to be eliminated.

Additionally, several fixed time span windows may be designated, wherein each may be utilized for a range of rotational speeds for which it provides adequately small filtering bandwidth. Employing window functions multipliers different from the rectangular function on the designated time span of data will further assist to drastically reduce filter side-band ripple.

The signal conditioning and balance measure extraction should introduce insignificant or known fixed delays to the sensed data. Certain aspects of the signal conditioning can be performed with analog or digital techniques.

Figure 8:
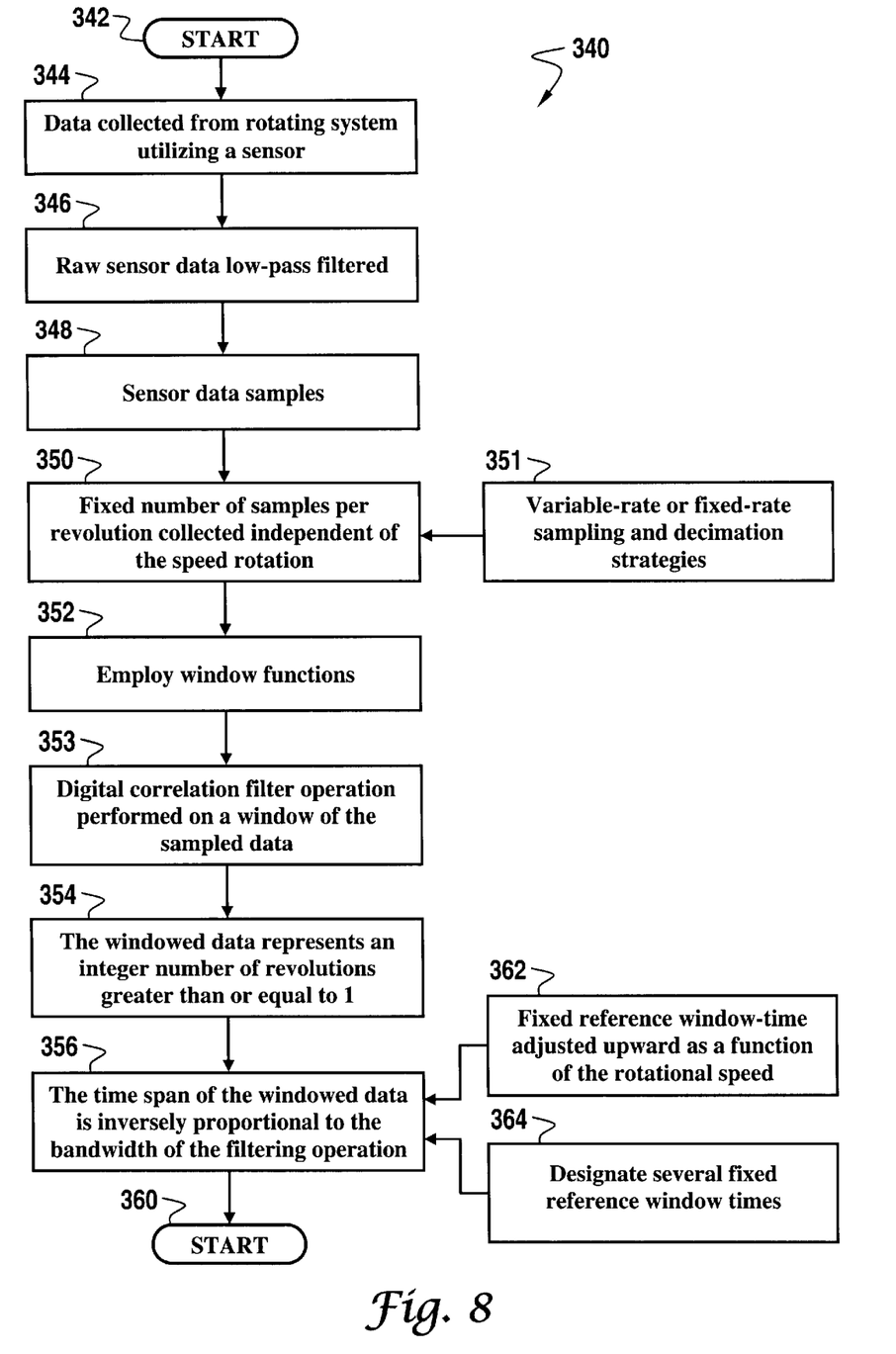
FIG. 8 illustrates a high-level flow chart of operations illustrating operational steps in accordance with preferred embodiments of the present invention.

FIG. 8 illustrates a high-level flow chart 340 of operations illustrating operational steps in accordance with preferred embodiments of the present invention. Those skilled in the art will appreciate that the operational steps illustrated in FIG. 8 represent operations that may be utilized in accordance with a variety of embodiments of the present invention. Such operational steps may be utilized to implement methods, systems and program products thereof. Such operational steps may also be implemented in the form of software modules. Such modules are generally collections of routines and data structures that perform particular tasks or implement particular abstract data types. Modules are typically composed of two portions: an interface, which lists constants, data types, variables, routines, subroutines, and so forth, which may be accessed by other modules, routines, or subroutines; and an implementation, which is accessible only to the module and which contains source code that actually implements the routines in the module.

Thus, the process may be initiated, as indicated at block 342. As depicted thereafter at block 344, data is collected from a rotating system, such as, for example, the self-balancing rotatable apparatus described with reference to FIGS. 1 to 7 herein. Raw sensor data is first low-pass filtered, as described at block 346 and then sampled as illustrated at block 348. To simplify later computation, as depicted at block 350, a fixed number of samples per revolution may be collected independent of the speed of rotation. Employing window functions prior to correlation filter operation, as indicated at block 352, such as, for example, a Hamming Window, on the windowed data, further assists in drastically reducing filter side-band ripple. For computational reasons, however, a rectangular window function may be utilized. Collecting a fixed number of samples per revolution can be accomplished through variable rate sampling or fixed-rate over-sampling and decimation strategies, as indicated at bock 351.

Thereafter, as described at block 353, a digital correlation filter operation can be performed on a window of the sampled data to extract a desired balance measure. As illustrated at block 354, the windowed data generally represents an integer number of revolutions greater than or equal to 1. As described at block 356, the time span of the windowed data can be inversely proportional to the bandwidth of the filtering operation. Thus, as the rotational speed associated with the rotating system is increased, the number of revolutions of data in the window is also generally increased. This can be based on a fixed reference window-time (T), adjusted upward as a function of rotational speed (time for 1 revolution, Trev), to represent the minimum number of full revolutions of data samples that extend beyond the reference time (round-up(T/Trev)) as indicated at block 362.

Note that the reference time is generally selected larger than the period of the low frequency modulation that will be eliminated. Another approach, as indicated at block 364, may be to designate several fixed reference windows-times, each of which is utilized for a range of rotational speeds for which it provides adequately small filtering bandwidth while minimizing the amount of data to be processed. The process then terminates, as indicated at block 360.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. For example, those skilled in the art can appreciate that the methods described herein, including mathematical formulations, can be implemented as a program product in the form of varying software modules, routines, and subroutines. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for dynamically balancing a rotating system by collecting and correlating data from said rotating system, wherein said rotating system contains sensors therein, said method comprising the steps of:
   sampling data from said sensors to obtain a select time span of said data, wherein sampled data contains information indicative of the dynamics of said rotating system, such that said select time span is of sufficient size to extract signal components of interest and attenuate low frequency modulations associated with said rotating system;
   adjusting said select time span of said data according a nearest number of full revolutions of said rotating system just exceeding said select time span; and
   processing said select time span of said sampled data to extract said signal components of interest and provide balance measures used to assess balance conditions and characterize control models and impact a course of balancing corrections necessary to dynamically place said rotating system in a balanced state.

2. The method of claim 1 further comprising the step of:
   collecting a fixed number of samples per revolution of said data independent of a rotational speed of said rotating system.

3. The method of claim 2 wherein the step of collecting a fixed number of samples per revolution of said data independent of a rotational speed of said rotating system, further comprises the step of:
   over-sampling said data at a select fixed rate to provide over-sampled data; and
   utilizing decimation strategies on said over-sampled data to achieve a desired fixed number of samples per revolution of data independent of a rotational speed of said rotating system.

4. The method of claim 2 wherein the step of collecting a fixed number of samples per revolution of said data independent of a rotational speed of said rotating system, further comprises the step of:
   applying variable-rate sampling strategies associated with a rotational speed of said rotating system to achieve a desired fixed number of samples per revolution of data independent of a rotational speed of said rotating system.

5. The method of claim 1 further comprising the step of:
   providing unique select time spans for different ranges of rotational speeds of said rotating system to maintain an amount of data to be processed while ensuring an adequate data time span to extract signal components of interest and attenuate low frequency modulations as rotational speeds of said rotating system are changed.

6. The method of claim 1 wherein the step of processing said select time span of said sampled data to extract said signal components of interest, further comprises the steps of:

applying a window function to modify data sampled in said select time span, thereby resulting in windowed data; and correlating said windowed data against sinusoidal functions that are referenced to a rotational speed and position of said rotating member of said rotating system.

7. The method of claim 1 wherein the step of sampling data from said sensors to obtain a select time span of said data, further comprising the steps of:

collecting said data from said rotating system;

filtering said data through a low-pass filter; and sampling said data.

8. The method of claim 1 wherein said rotating system comprises a washing appliance.

9. A method for dynamically balancing a rotating system by collecting and correlating data from said rotating system, wherein said rotating system contains sensors therein, said method comprising the steps of:

sampling data from said sensors to obtain a select time span of said data, wherein sampled data contains information indicative of the dynamics of said rotating system, such that said select time span is of sufficient size to extract signal components of interest and attenuate low frequency modulations associated with said rotating system;

adjusting said select time span of said data according a nearest number of full revolutions of said rotating system just exceeding said select time span;

processing said select time span of said sampled data to extract said signal components of interest and provide balance measures used to assess balance conditions and characterize control models and impact a course of balancing corrections necessary to dynamically place said rotating system in a balanced state; and collecting a fixed number of samples per revolution of said data independent of a rotational speed of said rotating system.

10. A method for dynamically balancing a rotating system by collecting and correlating data from said rotating system, wherein said rotating system contains sensors therein, said method comprising the steps of:

sampling data from said sensors to obtain a select time span of said data, wherein sampled data contains information indicative of the dynamics of said rotating system, such that said select time span is of sufficient size to extract signal components of interest and attenuate low frequency modulations associated with said rotating system;

adjusting said select time span of said data according a nearest number of full revolutions of said rotating system just exceeding said select time span;

processing said select time span of said sampled data to extract said signal components of interest and provide balance measures used to assess balance conditions and characterize control models and impact a course of balancing corrections necessary to dynamically place said rotating system in a balanced state; and providing unique select time spans for different ranges of rotational speeds of said rotating system to maintain an amount of data to be processed while ensuring an adequate data time span to extract signal components of interest and attenuate low frequency modulations as rotational speeds of said rotating system are increased.

11. A system for dynamically balancing a rotating device by collecting and correlating data from said rotating device, wherein said rotating device contains sensors therein, said system comprising:

sampled data collected from said sensors to obtain a select time span of said data, wherein said sampled data contains information indicative of the dynamics of said rotating device, such that said select time span is of sufficient size to extract signal components of interest and attenuate low frequency modulations associated with said rotating device;

said select time span of said data adjusted according a nearest number of full revolutions of said rotating device just exceeding said select time span; and said select time span of said sampled data processed to extract said signal components of interest and provide balance measures used to assess balance conditions and characterize control models and impact a course of balancing corrections necessary to dynamically place said rotating device in a balanced state.

12. The system of claim 11 further comprising the steps of:

a fixed number of samples per revolution of said data independent of a rotational speed of said rotating device.

13. The system of claim 12 wherein:

said data is over-sampled at a select fixed rate to provide over-sampled data; and decimation strategies are utilized upon said over-sampled data to achieve a desired fixed number of samples per revolution of data independent of a rotational speed of said rotating device.

14. The system of claim 12 further comprising variable-rate sampling strategies associated with a rotational speed of said rotating device to achieve a desired fixed number of samples per revolution of data independent of a rotational speed of said rotating device.

15. The system of claim 11 further comprising:

unique select time spans provided for different ranges of rotational speeds of said rotating device to maintain an amount of data to be processed while ensuring an adequate data time span to extract signal components of interest and attenuate low frequency modulations as rotational speeds of said rotating device are changed.

16. The system of claim 11 further comprising:

a window function applied to modify data sampled in said select time span, thereby resulting in windowed data; and said windowed data correlated against sinusoidal functions that are referenced to a rotational speed and position of said rotating member of said rotating device.

17. The system of claim 11 further comprising:

said data collected from said rotating device;

filtered through a low-pass filter; and said sampled data thereof.

18. The system of claim 11 wherein said rotating device comprises a washing appliance.

19. A system for dynamically balancing a rotating device by collecting and correlating data from said rotating device, wherein said rotating device contains sensors therein, said system comprising:

sampled data collected from said sensors to obtain a select time span of said data, wherein said sampled data contains information indicative of the dynamics of said rotating device, such that said select time span is of sufficient size to extract signal components of interest and attenuate low frequency modulations associated with said rotating device;

said select time span of said data adjusted according a nearest number of full revolutions of said rotating device just exceeding said select time span;

said select time span of said sampled data processed to extract said signal components of interest and provide balance measures used to assess balance conditions and characterize control models and impact a course of balancing corrections necessary to dynamically place said rotating device in a balanced state; and a fixed number of samples per revolution of said data independent of a rotational speed of said rotating device.

20. A system for dynamically balancing a rotating device by collecting and correlating data from said rotating device, wherein said rotating device contains sensors therein, said system comprising:

sampled data collected from said sensors to obtain a select time span of said data, wherein sampled data contains information indicative of the dynamics of said rotating device, such that said select time span is of sufficient size to extract signal components of interest and attenuate low frequency modulations associated with said rotating device;

said select time span of said data adjusted according a nearest number of full revolutions of said rotating device just exceeding said select time span;

said select time span of said sampled data processed to extract said signal components of interest and provide balance measures used to assess balance conditions and characterize control models and impact a course of balancing corrections necessary to dynamically place said rotating device in a balanced state; and unique select time spans provided for different ranges of rotational speeds of said rotating device to maintain an amount of data to be processed while ensuring an adequate data time span to extract signal components of interest and attenuate low frequency modulations as rotational speeds of said rotating device are increased.

* * * * *